(12) United States Patent
Kim et al.

(10) Patent No.: US 10,075,066 B2
(45) Date of Patent: Sep. 11, 2018

(54) INTERNAL VOLTAGE GENERATION CIRCUIT AND SYSTEM INCLUDING THE SAME

(71) Applicant: SK hynix Inc., Icheon-si Gyeonggi-do (KR)

(72) Inventors: Kyung Hoon Kim, Icheon-si Gyeonggi-do (KR); Jee Yeon Keh, Icheon-si Gyeonggi-do (KR)

(73) Assignee: SK hynix Inc., Icheon-si, Gyeonggi-do (KR)

( * ) Notice: Subject to any disclaimer, the term of this patent is extended or adjusted under 35 U.S.C. 154(b) by 272 days.

(21) Appl. No.: 15/190,278

(22) Filed: Jun. 23, 2016

(65) Prior Publication Data

US 2017/0250599 A1   Aug. 31, 2017

(30) Foreign Application Priority Data

Feb. 26, 2016   (KR) .................. 10-2016-0023644

(51) Int. Cl.
 G05F 1/10    (2006.01)
 H02M 3/04   (2006.01)
 H02M 1/08   (2006.01)
(52) U.S. Cl.
 CPC ............. *H02M 3/04* (2013.01); *H02M 1/08* (2013.01)

(58) Field of Classification Search
 CPC .................................. H02M 3/04; H02M 1/08
 USPC ............... 327/538, 530, 540–543, 547, 548; 323/313; 341/158, 161
 See application file for complete search history.

(56) References Cited

U.S. PATENT DOCUMENTS

| | | | | |
|---|---|---|---|---|
| 5,426,431 A | 6/1995 | Ryu | | |
| 5,973,528 A * | 10/1999 | Halamik | ................. | H01L 23/34 257/E23.08 |
| 6,448,845 B2 * | 9/2002 | Davies | ................... | G11C 16/12 327/538 |
| 2006/0132225 A1 * | 6/2006 | Naka | ....................... | G05F 3/242 327/538 |
| 2012/0313696 A1 * | 12/2012 | Tejada | .................. | G11C 5/147 327/538 |
| 2015/0192946 A1 * | 7/2015 | Kwon | ...................... | G05F 3/08 323/313 |

* cited by examiner

*Primary Examiner* — Thomas Skibinski
(74) *Attorney, Agent, or Firm* — William Park & Associates Ltd.

(57) ABSTRACT

An internal voltage generation circuit may be provided. The internal voltage generation circuit may include a first internal voltage generation circuit configured to provide a reference internal voltage to either an internal voltage control circuit or a node at which an output internal voltage is generated. The internal voltage generation circuit may include a second internal voltage generation circuit configured to change a level of the output internal voltage. The internal voltage generation circuit may include an internal voltage control circuit configured to compare the reference internal voltage with the output internal voltage and control the first and second internal voltage generation circuits to change the level of the output internal voltage according to a comparison.

20 Claims, 6 Drawing Sheets

INTERNAL VOLTAGE GENERATION CIRCUIT AND SYSTEM INCLUDING THE SAME

CROSS-REFERENCES TO RELATED APPLICATION

The present application claims priority under 35 U.S.C. § 119(a) to Korean application number 10-2016-0023644, filed on Feb. 26, 2016, in the Korean Intellectual Property Office, which is incorporated herein by reference in its entirety.

BACKGROUND

1. Technical Field

Various embodiments may generally relate to a semiconductor device, and more particularly, to an internal voltage generation circuit and a system including the same.

2. Related Art

A semiconductor device may be operated by an external voltage applied from a power source such as a power supply and/or a power management unit. The semiconductor device may perform various operations, and have various levels of supply voltages for performing the various operations. Thus, the semiconductor device generally includes an internal voltage generation circuit to generate internal voltages, from the external voltage, suitable for the respective operations.

Representative examples of the internal voltages generated from the internal voltage generation circuit may include a pumping voltage, a bulk bias voltage, a core voltage and a peri-voltage. The internal voltage generation circuit generally includes a comparator, and the comparator may compare the levels of a reference voltage and a generated internal voltage, in order to adjust the level of the internal voltage. To execute operations reliably with the semiconductor device, the internal voltage generation circuit must rapidly change the generated internal voltage to a target level. That is, the settling time of the internal voltage must be reduced. Furthermore, the current consumption of the semiconductor device must be reduced in order to generate the internal voltage suitable for a high-speed and low-power operation of the semiconductor device.

SUMMARY

In an embodiment, an internal voltage generation circuit may be provided. The internal voltage generation circuit may include an internal voltage control circuit configured to generate an enable signal and a switch control signal based on a comparison result between a reference internal voltage and an output internal voltage. The internal voltage generation circuit may include a first internal voltage generation circuit configured to generate the reference internal voltage based on a setting code, and may provide the reference internal voltage to one of the internal voltage control circuit and a node from which the output internal voltage is outputted, based on the enable signal. The internal voltage generation circuit may include a second internal voltage generation circuit configured to generate the output internal voltage based on the switch control signal.

In an embodiment, an internal voltage generation circuit may be provided. The internal voltage generation circuit may include a first internal voltage generation circuit configured to generate a reference internal voltage based on a setting code, and may provide the reference internal voltage to a node from which an output internal voltage is outputted, when the level of the output internal voltage approaches the level of the reference internal voltage. The internal voltage generation circuit may include a second internal voltage generation circuit configured to generate the output internal voltage based on a switch control signal. The internal voltage generation circuit may include an internal voltage control circuit configured to control the first and second internal voltage generation circuits to adjust the voltage level of the output internal voltage based on a comparison result between the reference internal voltage and the output internal voltage.

In an embodiment, an internal voltage generation circuit may be provided. The internal voltage generation circuit may include a first internal voltage generation circuit configured to provide a reference internal voltage to either an internal voltage control circuit or a node at which an output internal voltage is generated. The internal voltage generation circuit may include a second internal voltage generation circuit configured to change a level of the output internal voltage. The internal voltage generation circuit may include an internal voltage control circuit configured to compare the reference internal voltage with the output internal voltage and control the first and second internal voltage generation circuits to change the level of the output internal voltage according to a comparison.

DETAILED DESCRIPTION

Examples of embodiments may provide an internal voltage generation circuit capable of selectively using an internal voltage generation unit including a resistive element and an internal voltage generation unit including a capacitive element, thereby rapidly generating an internal voltage while reducing current consumption, and a system using the same.

Figure 1:
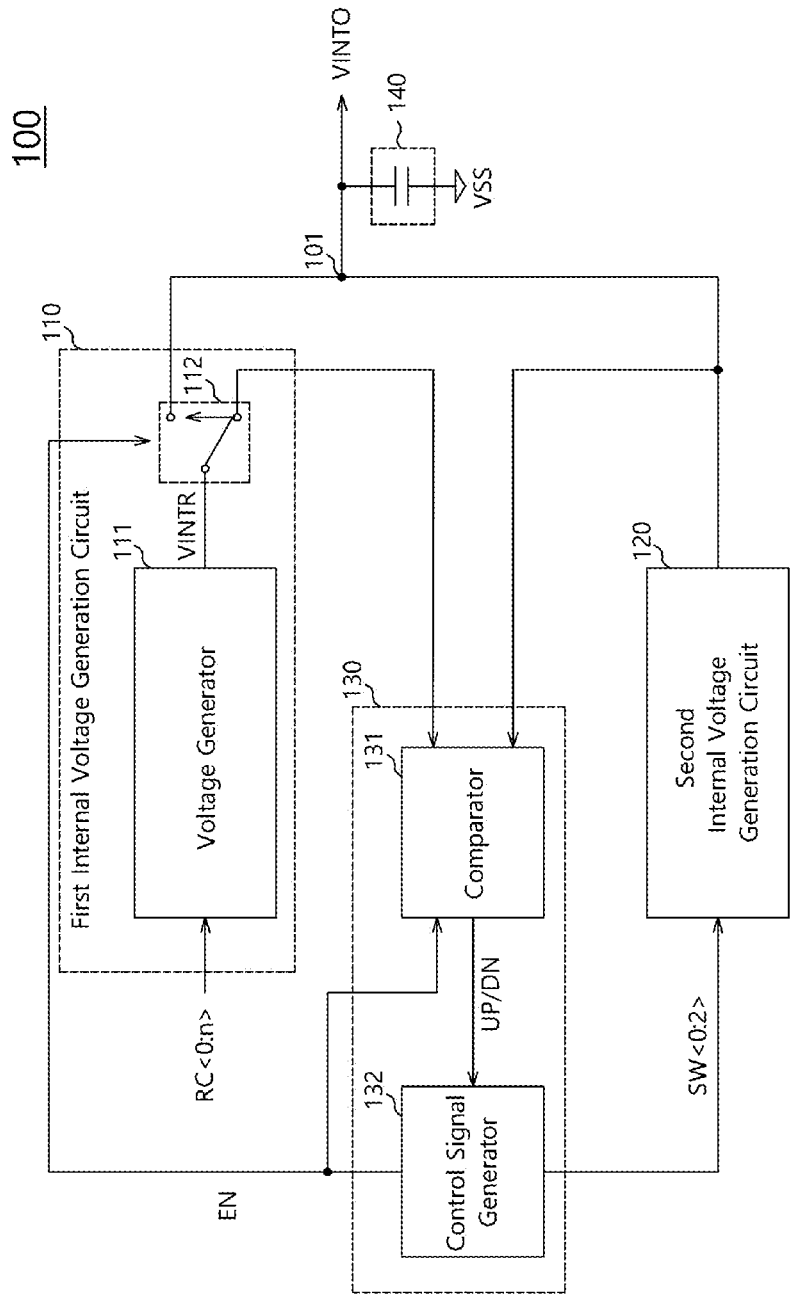
FIG. 1 is a diagram illustrating a representation of an example of the configuration of an internal voltage generation circuit according to an embodiment.

FIG. 1 is a diagram illustrating a representation of an example of the configuration of an internal voltage generation circuit 100 according to an embodiment. Referring to FIG. 1, the internal voltage generation circuit 100 may include a first internal voltage generation circuit 110 including a resistive element and a second internal voltage generation circuit 120 including a capacitive element. The internal voltage generation circuit 100 may receive an output internal voltage VINTO, compare the level of the output internal voltage VINTO to the level of a reference internal voltage VINTR outputted from the first internal voltage generation circuit 110, and change the level of the output internal voltage VINTO. The internal voltage generation circuit 100 may use the reference internal voltage VINTR as a reference voltage for adjusting the level of the output internal voltage VINTO. Since the reference internal voltage VINTR is generated through the resistive element, the reference internal voltage VINTR may have a correct voltage level. Since the output internal voltage VINTO is generated through the capacitive element, the level of the output internal voltage VINTO can be rapidly changed to around a target level. Thus, a settling time during which the output internal voltage VINTO is generated can be reduced.

Referring to FIG. 1, the internal voltage generation circuit 100 may include the first internal voltage generation circuit 110, the second internal voltage generation circuit 120 and an internal voltage control circuit 130. The first internal voltage generation circuit 110 may generate the reference internal voltage VINTR based on a setting code RC<0:n> where n is an integer equal to or more than 2. The setting code RC<0:n> for determining the levels of the reference internal voltage VINTR and the output internal voltage VINTO may be applied from an external device. The first internal voltage generation circuit 110 may generate the reference internal voltage VINTR having the target level according to the setting code RC<0:n>.

The first internal voltage generation circuit 110 may provide the reference internal voltage VINTR to one of the internal voltage control circuit 130 and a node 101 at which the output internal voltage VINTO is generated, based on the level of the output internal voltage VINTO. For example, the first internal voltage generation circuit 110 may provide the reference internal voltage VINTR to the internal voltage control circuit 130 when the level of the output internal voltage VINTO did not reach the target level, and provide the reference internal voltage VINTR to the node 101 when the level of the output internal voltage VINTO has reached the target level. The first internal voltage generation circuit 110 may provide the reference internal voltage VINTR to one of the internal voltage control circuit 130 and the node 101 in response to an enable signal EN generated by the internal voltage control circuit 130. The first internal voltage generation circuit 110 may generate the reference internal voltage VINTR using the resistive element. Thus, the reference internal voltage VINTR may have a correct voltage level.

The second internal voltage generation circuit 120 may be controlled by the internal voltage control circuit 130, and may change the level of the output internal voltage VINTO. Since the second internal voltage generation circuit 120 changes the level of the output internal voltage VINTO using the capacitive element, the second internal voltage generation circuit 120 can rapidly change the level of the output internal voltage VINTO.

The internal voltage control circuit 130 may compare the levels of the reference internal voltage VINTR and the output internal voltage VINTO, and control the first and second internal voltage generation circuits 110 and 120 to change the level of the output internal voltage VINTO according to the comparison result. For example, when the level of the output internal voltage VINTO is higher than the level of the reference internal voltage VINTR, the internal voltage control circuit 130 may control the second internal voltage generation circuit 120 to lower the level of the output internal voltage VINTO. When the level of the output internal voltage VINTO is lower than the level of the reference internal voltage VINTR, the internal voltage control circuit 130 may control the second internal voltage generation circuit 120 to raise the level of the output internal voltage VINTO. When the level of the output internal voltage VINTO corresponds to the level of the reference internal voltage VINTR, the internal voltage control circuit 130 may control the first internal voltage generation circuit 110 to provide the reference internal voltage VINTR to the node 101.

Referring to FIG. 1, the internal voltage control circuit 130 may include a comparator 131 and a control signal generator 132. The comparator 131 may receive the reference internal voltage VINTR and the output internal voltage VINTO. The comparator 131 may compare the level of the reference internal voltage VINTR to the level of the output internal voltage VINTO, and output a comparison signal UP/DN. The comparison signal UP/DN may have level information of the output internal voltage VINTO with respect to the reference internal voltage VINTR. The comparison signal UP/DN may include an up signal UP and a down signal DN. The comparator 131 may generate the up signal UP when the level of the output internal voltage VINTO is higher than the level of the reference internal voltage VINTR, and generate the down signal DN when the level of the output internal voltage VINTO is lower than the level of the reference internal voltage VINTR.

The control signal generator 132 may generate switch control signals SW<0:2> and an enable signal EN, based on the comparison signal UP/DN outputted from the comparator 131. The control signal generator 132 may control the second internal voltage generation circuit 120 based on the switch control signals SW<0:2>, and control the first internal voltage generation circuit 110 based on the enable signal EN. The switch control signals SW<0:2> may include a first switch control signal SW<0> and a second switch control signal SW<1>. For example, the control signal generator 132 may generate the first switch control signal SW<0> based on the down signal DN, and generate the second switch control signal SW<1> based on the up signal UP. The second internal voltage generation circuit 120 may raise the level of the output internal voltage VINTO in response to the first switch control signal SW<0>, and lower the level of the output internal voltage VINTR in response to the second switch control signal SW<1>.

The control signal generator 132 may enable the enable signal EN when the up signal UP and the down signal DN are alternately generated a predetermined number of times. When the level of the output internal voltage VINTO approaches the level of the reference internal voltage VINTR, the comparator 131 may alternately generate the up signal UP and the down signal DN. When the up signal UP and the down signal DN are alternately generated the predetermined number of times, the control signal generator 132 may determine that the level of the output internal voltage VINTO reached the level of the reference internal voltage VINTR, and enable the enable signal EN. When the enable signal EN is disabled, the first internal voltage generation circuit 110 may provide the reference internal voltage VINTR to the comparator 131, and not be coupled to the node 101. When the enable signal EN is enabled, the first internal voltage generation circuit 110 may provide the reference internal voltage VINTR to the node 101, and retain the level of the output internal voltage VINTO having reached the target level. When the enable signal EN is disabled, the comparator 131 may compare the reference internal voltage VINTR and the output internal voltage VINTO and generate the comparison signal UP/DN. The comparator 131 may be deactivated when the enable signal EN is enabled.

Referring to FIG. 1, the first internal voltage generation circuit 110 may include a voltage generator 111 and a switching circuit 112. The voltage generator 111 may generate the reference internal voltage VINTR based on the setting code RC<0:n>. The switching circuit 112 may couple the voltage generator 111 to one of either the comparator 131 or the node 101 in response to the enable signal EN. When the enable signal EN is disabled, the switching circuit 112 may provide the reference internal voltage VINTR to the comparator 131, and not provide the reference internal voltage VINTR to the node 101. When the enable signal EN is enabled, the switching circuit 112 may provide the reference internal voltage VINTR to the node 101, and not provide the reference internal voltage VINTR to the comparator 131.

Referring to FIG. 1, the internal voltage generation circuit 100 may further include an output stabilizer 140. The output stabilizer 140 may stabilize the level of the output internal voltage VINTO. The output stabilizer 140 may include a capacitor element coupled between the node 101 and a ground voltage VSS.

Figure 2:
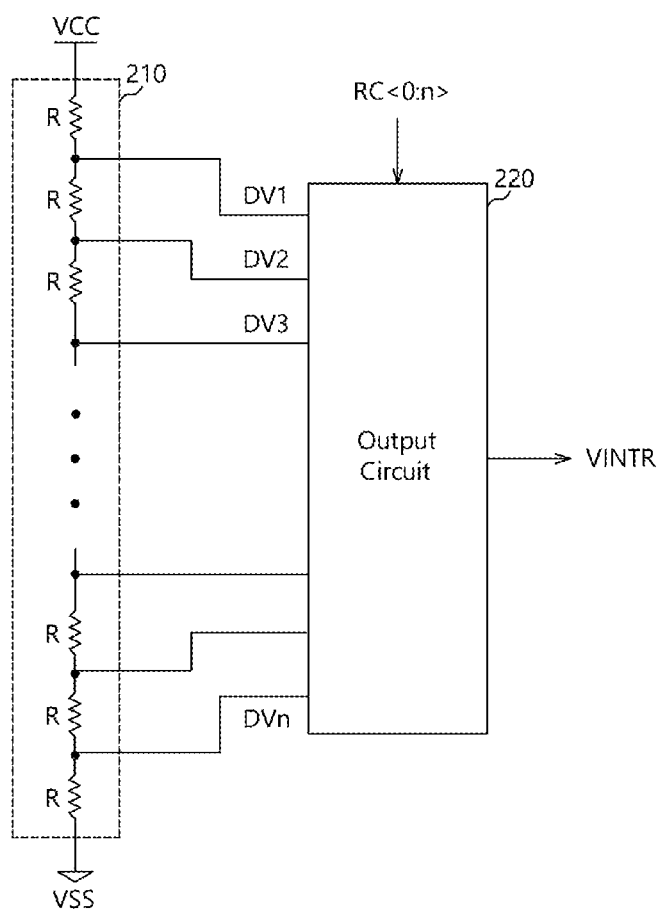
FIG. 2 is a diagram illustrating a representation of an example of the configuration of a voltage generator of FIG. 1.

FIG. 2 is a diagram illustrating a representation of an example of the configuration of the voltage generator 111 of FIG. 1. Referring to FIG. 2, the voltage generator 111 may include a resistor ladder 210 and an output circuit 220. The resistor ladder 210 may include a plurality of resistors R. The plurality of resistors R may have the same resistance value. Between a supply voltage VCC and a ground voltage VSS, the plurality of resistors R may be sequentially coupled in series. The resistor ladder 210 may provide a plurality of divided voltages DV1 to DVn generated by the resistors R to the output circuit 220. The output circuit 220 may output one of the divided voltages DV1 to DVn as the reference internal voltage VINTR according to the setting code RC<0:n>. Since the resistor ladder 210 generates the divided voltages DV1 to DVn between the supply voltage VCC and the ground voltage VSS, the resistor ladder 210 may continuously consume a constant current. When the resistor ladder 210 is coupled to the node 101, the resistor ladder 210 may increase the loading of the node 101 to increase the time during which the level of the output internal voltage VINTO is changed. However, since the voltage generator 111 generates the reference internal voltage VINTR using the resistor ladder 210, the reference internal voltage VINTR may have a correct voltage level. Since the voltage generator 111 is selectively coupled to the node 101 by the switching circuit 112, the voltage generator 111 may not increase the loading of the node 101 when the level of the output internal voltage VINTO is changed, while providing the correct reference internal voltage VINTR.

Figure 3:
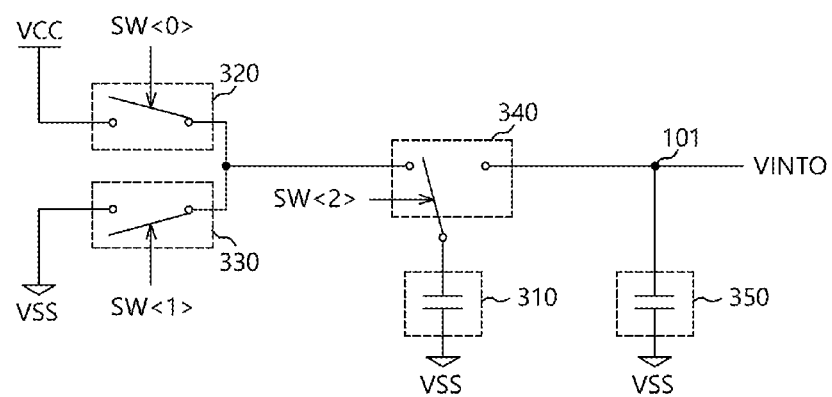
FIG. 3 is a diagram illustrating a representation of an example of the configuration of a second internal voltage generation circuit of FIG. 1.

FIG. 3 is a diagram illustrating a representation of an example of the configuration of the second internal voltage generation circuit 120 of FIG. 1. Referring to FIG. 3, the second internal voltage generation circuit 120 may include a first capacitor 310, a first switch 320, a second switch 330 and a third switch 340. The first switch 320 may provide the supply voltage VCC to the first capacitor 310 in response to the first switch control signal SW<0>. When the first switch 320 is turned on, the first capacitor 310 may be charged with the supply voltage VCC. The second switch 330 may provide the supply voltage VCC to the first capacitor 310 in response to the second switch control signal SW<1>. When the second switch 330 is turned on, the first capacitor 310 may be discharged to the ground voltage VSS.

In an embodiment, the switch control signals SW<0:2> generated from the control signal generator 132 may include a third switch control signal SW<2>. The third switch control signal SW<2> may be generated after the first switch control signal SW<0> or the second switch control signal SW<1> is generated. The third switch control signal SW<2> may be generated alternately with the first switch control signal SW<0> or the second switch control signal SW<1>. The third switch 340 may couple the first capacitor 310 to the node 101 from which the output internal voltage VINTO is outputted, in response to the third switch control signal SW<2>. Since the first capacitor 310 is coupled to the node 101 by the third switch 340, the level of the output internal voltage VINTO may be changed according to the state of charge of the first capacitor 310. For example, the level of the output internal voltage VINTO may be raised when the first capacitor 310 is charged, or lowered when the first capacitor 310 is discharged.

The second internal voltage generation circuit 120 may further include a second capacitor 350. The second capacitor 350 may be coupled between the node 101 and the ground voltage VSS. The second capacitor 350 may stabilize the level of the output internal voltage VINTO.

The configuration of the second internal voltage generation circuit 120 in FIG. 3 is only an example, and any other configurations can be applied to the present disclosure as long as they can adjust the level of an output voltage by charging or discharging a capacitor. In an embodiment, the internal voltage generation circuit 100 may include a plurality of second internal voltage generation circuits, and may be modified in such a manner that the internal voltage control circuit 130 uses one or more of the second internal voltage generation circuits to generate the output internal voltage.

Figure 4:
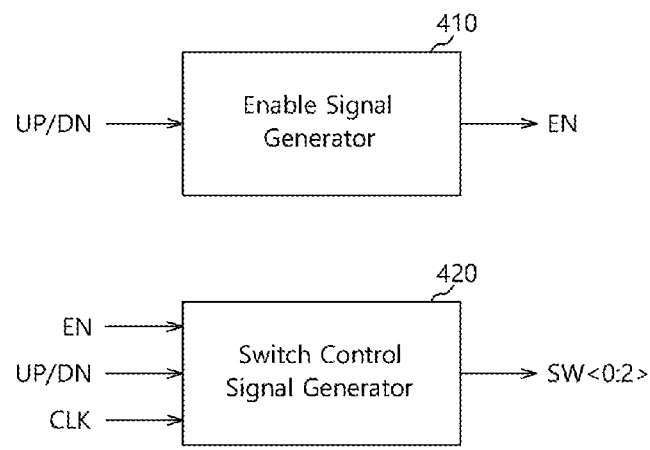
FIG. 4 is a diagram illustrating a representation of an example of the configuration of a control signal generator of FIG. 1.

FIG. 4 is a diagram illustrating a representation of an example of the configuration of the control signal generator 132 of FIG. 1. Referring to FIG. 4, the control signal generator 132 may include an enable signal generator 410 and a switch control signal generator 420. The enable signal generator 410 may receive the comparison signal UP/DN and generate the enable signal EN. The enable signal generator 410 may count how many times the up signal UP and the down signal DN are alternately generated, and enable the enable signal EN when the counting result reaches a predetermined number of times.

Figure 5:
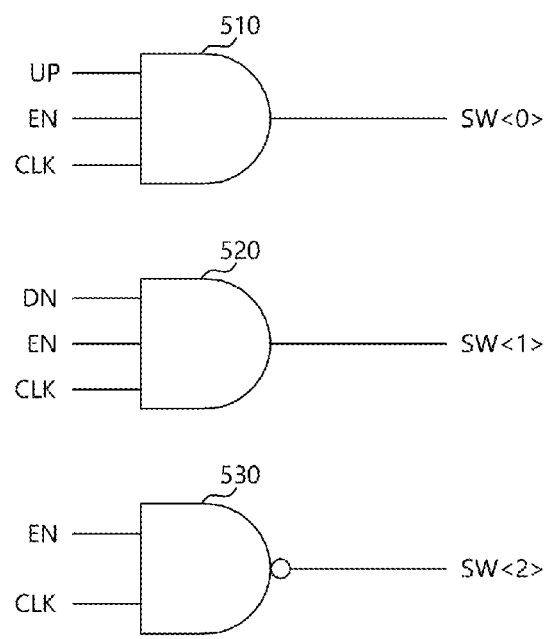
FIG. 5 is a diagram illustrating a representation of an example of the configuration of a switch control signal generator of FIG. 4.

The switch control signal generator 420 may generate the switch control signals SW<0:2> using the enable signal EN, the comparison signal UP/DN and a clock signal CLK. FIG. 5 is a diagram illustrating a representation of an example of the configuration of the switch control signal generator 420 of FIG. 4. Referring to FIG. 5, the switch control signal generator 420 may include logic gates, for example but not limited to, a first AND gate 510, a second AND gate 520 and a NAND gate 530. The first AND gate 510 may receive the up signal UP, the enable signal EN and the clock signal CLK, and output the first switch control signal SW<0>. When the up signal UP enabled to a high level, the enable signal EN is disabled to a high level, and the clock signal CLK is at a high level, the first AND gate 510 may enable the first switch control signal SW<0> to a high level. The second AND gate 520 may receive the down signal DN, the enable signal EN and the clock signal CLK, and output the second switch control signal SW<1>. When the down signal DN is enabled to a high level, the enable signal EN is disabled to a high level, and the clock signal CLK is at a high level, the second AND gate 520 may enable the second switch control signal SW<1> to a high level. The NAND gate 530 may receive the enable signal EN and the clock signal CLK, and generate the third switch control signal SW<2>. When the enable signal EN is disabled to a high level and the clock signal CLK is at a low level, the NAND gate 530 may enable the third switch control signal SW<3> to a high level.

Figure 6:
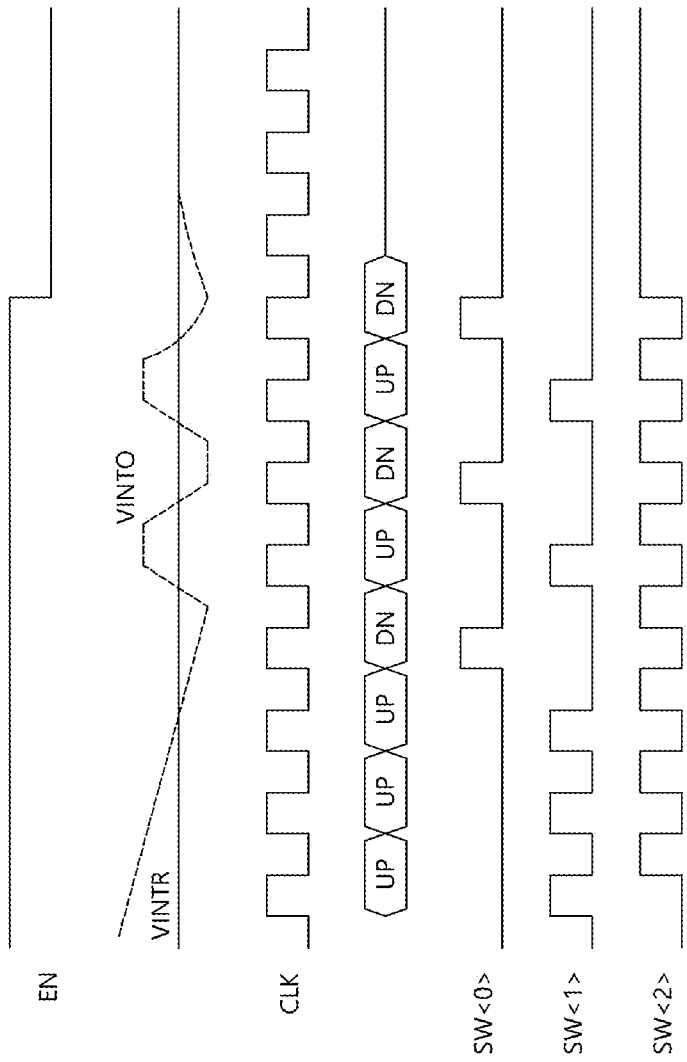
FIG. 6 is a timing diagram illustrating a representation of an example of the operation of the internal voltage generation circuit according to an embodiment.

FIG. 6 is a timing diagram illustrating a representation of an example of the operation of the internal voltage generation circuit 100 according to an embodiment. Referring to FIGS. 1 and 6, the operation of the internal voltage generation circuit 100 according to an embodiment will, for example, be described as follows. The internal voltage generation circuit 100 may receive the disabled enable signal EN at the initial stage of the operation. The voltage generator 111 may generate the reference internal voltage VINTR according to the setting code RC<0:n>. The switching circuit 112 may couple the voltage generator 111 to the comparator 131 in response to the disabled enable signal EN. Thus, the first internal voltage generation circuit 110 may provide the reference internal voltage VINTR to the internal voltage control circuit 130. When the level of the output internal voltage VINTO is higher than the level of the reference internal voltage VINTR, the comparator 131 may enable the up signal UP. The switch control signal generator 420 may generate the second switch control signal SW<1> which is enabled at a high-level period of the clock signal CLK. Thus, the second switch 330 of the second internal voltage generation circuit 120 may be turned on to discharge the first capacitor 310 to the ground voltage VSS. The switch control signal generator 420 may generate the third switch control signal SW<2> at a low-level period of the clock signal CLK. When the third switch 340 is turned on, the discharged first capacitor 310 may be coupled to the node 101, and the level of the output internal voltage VINTO may be lowered.

The comparator 131 may compare the lowered output internal voltage VINTO and the reference internal voltage VINTR, and generate the up signal UP or the down signal DN. FIG. 6 illustrates, for example, that the level of the output internal voltage VINTO becomes lower than the level of the reference internal voltage VINTR, after two up signals UP are further generated. When the level of the output internal voltage VINTO becomes lower than the level of the reference internal voltage VINTR, the comparator 131 may enable the down signal DN. The switch control signal generator 420 may generate the first switch control signal SW<0> at a high-level period of the clock signal CLK. Thus, the first switch 320 of the second internal voltage generation circuit 120 may be turned on to charge the first capacitor 310 with the supply voltage VDD. Then, when the third switch 340 is turned on, the charged first capacitor 310 may be coupled to the node 101, and the level of the output internal voltage VINTO may be raised.

When the level of the output internal voltage VINTO approaches the level of the reference internal voltage VINTR, the comparator 131 may alternately generate the up signal UP and the down signal DN, and the level of the output internal voltage VINTO may fluctuate above and below the level of the reference internal voltage VINTR. The enable signal generator 410 may disable the enable signal EN when the up signal UP and the down signal DN are alternately generated a predetermined number of times. When the enable signal EN is disabled, the comparator 131 may be deactivated, the first and second switch control signals SW<0:1> may not be generated, and the third switch control signal SW<2> may maintain the enabled state. The switching circuit 112 may couple the voltage generator 111 to the node 101. The first internal voltage generation circuit 110 may provide the reference internal voltage VINTR as the output internal voltage VINTO, and the level of the output internal voltage VINTO may be retained.

Figure 7:
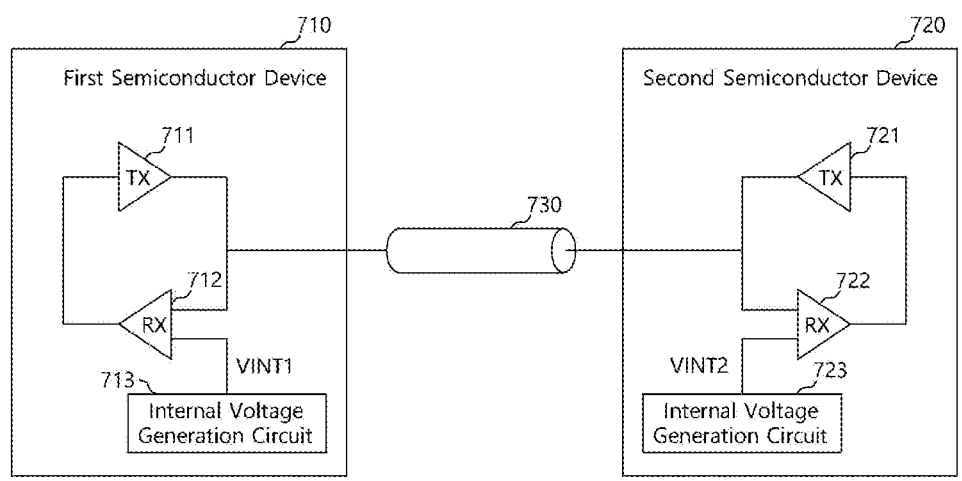
FIG. 7 is a diagram illustrating a representation of an example of the configuration of a system according to an embodiment.

FIG. 7 is a diagram illustrating a representation of an example of the configuration of a system 7 according to an embodiment. Referring to FIG. 7, the system 7 may include a first semiconductor device 710 and a second semiconductor device 720. The first and second semiconductor devices 710 and 720 may serve as electronic elements which communicate with each other. In an embodiment, the first semiconductor device 710 may serve as a master device, and the second semiconductor device 720 may serve as a slave device which is operated under control of the first semiconductor device 710. For example, the first semiconductor device 710 may correspond to a host device such as a processor, and the processor may include a CPU (Central Processing Unit), a GPU (Graphic Processing Unit), an MMP (Multi-Media Processor) and a digital signal processor. Furthermore, processor chips having various functions, such as an AP (Application Processor), may be combined and implemented in the form of a system on chip. The second semiconductor device 720 may serve as a memory, and the memory may include a volatile memory and a nonvolatile memory. The nonvolatile memory may include SRAM (Static RAM), DRAM (Dynamic RAM) and SDRAM (Synchronous DRAM), and the nonvolatile memory may include ROM (Read Only Memory), PROM (Programmable ROM), EEPROM (Electrically Erase and Programmable ROM), EPROM (Electrically Programmable ROM), Flash memory, PRAM (Phase change RAM), MRAM (Magnetic RAM), RRAM (Resistive RAM) and FRAM (Ferroelectric RAM).

The first and second semiconductor devices 710 and 720 may be coupled to each other through a signal transmission line 730. The signal transmission line 730 may include a channel, link or bus. The signal transmission line 730 may serve as a data bus, for example. The first semiconductor device 710 may include transceiver circuit (TX) 711 and a receiver circuit (RX) 712. The transceiver circuit 711 may generate an output signal according to an internal signal of the first semiconductor device 710, and transmit the output signal to the second semiconductor device 720 through the signal transmission line 730. The receiver circuit 712 may receive a signal from the second semiconductor device 720 through the signal transmission line 730, and generate an internal signal. The receiver circuit 712 may compare the signal transmitted through the signal transmission line 730 to an internal voltage VINT1, and generate the internal signal by amplifying the signal. The first semiconductor device 710 may include an internal voltage generation circuit 713 for providing the internal voltage VINT1 to the receiver circuit 712. The internal voltage generation circuit 100 of FIG. 1 may be applied as the internal voltage generation circuit 713. The second semiconductor device 720 may include a transceiver circuit (TX) 721 and a receiver circuit (RX) 722. The transceiver circuit 721 may generate an output signal according to an internal signal of the second semiconductor device 720, and transmit the output signal to the first semiconductor device 710 through the signal transmission line 730. The receiver circuit 722 may receive a signal from the first semiconductor device 710 through the signal transmission line 730, and generate an internal signal. The receiver circuit 722 may compare the signal transmitted through the signal transmission line 730 to an internal voltage VINT2, and generate the internal signal by amplifying the signal. The second semiconductor device 720 may include an internal voltage generation circuit 723 for providing the internal voltage VINT2 to the receiver circuit 722. The internal voltage generation circuit 100 of FIG. 1 may be applied as the internal voltage generation circuit 723.

While certain embodiments have been described above, it will be understood to those skilled in the art that the embodiments described are by way of example only. Accordingly, the semiconductor device described herein should not be limited based on the described embodiments. Rather, the semiconductor device described herein should only be limited in light of the claims that follow when taken in conjunction with the above description and accompanying drawings.

What is claimed is:

1. An internal voltage generation circuit comprising:
   an internal voltage control circuit configured to generate an enable signal and a switch control signal based on a comparison result between a reference internal voltage and an output internal voltage;
   a first internal voltage generation circuit configured to generate the reference internal voltage based on a setting code, and provide the reference internal voltage to one of the internal voltage control circuit and a node from which the output internal voltage is outputted, based on the enable signal; and
   a second internal voltage generation circuit configured to generate the output internal voltage based on the switch control signal.

2. The internal voltage generation circuit according to claim 1, wherein the first internal voltage generation circuit comprises:
   a voltage generator configured to generate the reference internal voltage based on the setting code; and
   a switching circuit configured to couple the voltage generator to either the comparator or the node, based on the enable signal.

3. The internal voltage generation circuit according to claim 2, wherein the voltage generator comprises a plurality of resistors coupled between a supply voltage and a ground voltage, and outputs one of a plurality of divided voltages outputted from the plurality of resistors as the reference internal voltage according to the setting code.

4. The internal voltage generation circuit according to claim 2, wherein the switching circuit provides the reference internal voltage to the comparator based on disablement of the enable signal, and provides the reference internal voltage to the node based on enablement of the enable signal.

5. The internal voltage generation circuit according to claim 1, wherein the switch control signal comprises first and second switch control signals, and
   the second internal voltage generation circuit raises the level of the second internal voltage based on the first switch control signal, and lowers the level of the second internal voltage based on the second switch control signal.

6. The internal voltage generation circuit according to claim 1, wherein the internal voltage control circuit comprises:
   a comparator configured to compare the reference internal voltage and the output internal voltage and generate a comparison signal; and
   a control signal generator configured to generate the enable signal and the switch control signal based on the comparison signal.

7. The internal voltage generation circuit according to claim 6, wherein the comparison signal comprises an up signal and a down signal, and
   the control signal generator enables the enable signal when the up signal and the down signal are alternately generated a predetermined number of times.

8. The internal voltage generation circuit according to claim 6, wherein the comparison signal comprises an up signal and a down signal, and
   the comparator generates the up signal when the level of the second internal voltage is higher than the level of the first internal voltage, and generates the down signal when the level of the second internal voltage is lower than the level of the first internal voltage.

9. The internal voltage generation circuit according to claim 6, wherein the control signal generator enables the first switch control signal based on the up signal, and enables the second switch control signal based on the down signal.

10. The internal voltage generation circuit according to claim 1, wherein the switch control signal comprises first to third switch control signals, and
    the second internal voltage generation circuit comprises:
    a capacitor;
    a first switch configured to charge the capacitor with a supply voltage based on the first switch control signal;
    a second switch configured to discharge the capacitor to a ground voltage based on the second switch control signal; and
    a third switch configured to couple the capacitor to the output internal voltage based on the third switch control signal.

11. An internal voltage generation circuit comprising:
    a first internal voltage generation circuit configured to generate a reference internal voltage based on a setting code, and provide the reference internal voltage to a node from which an output internal voltage is outputted, when the level of the output internal voltage approaches the level of the reference internal voltage;
    a second internal voltage generation circuit configured to generate the output internal voltage based on a switch control signal; and
    an internal voltage control circuit configured to control the first and second internal voltage generation circuits to adjust the voltage level of the output internal voltage based on a comparison result between the reference internal voltage and the output internal voltage.

12. The internal voltage generation circuit according to claim 11, wherein the internal voltage control circuit comprises:
    a comparator configured to compare the reference internal voltage and the output internal voltage and generate a comparison signal; and
    a control signal generator configured to generate an enable signal and a switch control signal based on the comparison signal.

13. The internal voltage generation circuit according to claim 12, wherein the comparator generates an up signal when the level of the output internal voltage is higher than the level of the reference internal voltage, and generates a down signal when the level of the output internal voltage is lower than the level of the reference internal voltage.

14. The internal voltage generation circuit according to claim 13, wherein the control signal generator generates a first switch control signal based on the down signal, and generates a second switch control signal based on the up signal.

15. The internal voltage generation circuit according to claim 14, wherein the second internal voltage generation circuit raises the level of the output internal voltage based on the first switch control signal, and lowers the level of the output internal voltage based on the second switch control signal.

16. The internal voltage generation circuit according to claim 14, wherein the second internal voltage generation circuit comprises:
 a capacitor;
 a first switching unit configured to charge the capacitor with a supply voltage based on the first switch control signal;
 a second switching unit configured to discharge the capacitor to a ground voltage based on the second switch control signal; and
 a third switching unit configured to couple the capacitor to the node based on the third switch control signal.

17. The internal voltage generation circuit according to claim 13, wherein the control signal generator generates the enable signal when the up signal and the down signal are alternately generated a predetermined number of times.

18. The internal voltage generation circuit according to claim 12, wherein the first internal voltage generation circuit comprises:
 a voltage generator configured to generate the reference internal voltage according to the setting code; and
 a switching circuit configured to provide the reference internal voltage to one of the comparator and the node, based on the enable signal.

19. The internal voltage generation circuit according to claim 18, wherein the voltage generator comprises a plurality of resistors coupled between a supply voltage and a ground voltage, and outputs one of a plurality of divided voltages outputted from the plurality of resistors as the reference internal voltage according to the setting code.

20. The internal voltage generation circuit according to claim 18, wherein the switching circuit provides the reference internal voltage to the comparator based on disablement of the enable signal, and provides the reference internal voltage to the node based on enablement of the enable signal.

\* \* \* \* \*